United States Patent
Khmelnitsky et al.

(10) Patent No.: US 8,892,831 B2
(45) Date of Patent: Nov. 18, 2014

(54) MEMORY SUBSYSTEM HIBERNATION

(75) Inventors: Vadim Khmelnitsky, Foster City, CA (US); Nir Jacob Wakrat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1102 days.

(21) Appl. No.: 12/193,551

(22) Filed: Aug. 18, 2008

(65) Prior Publication Data
US 2009/0182962 A1    Jul. 16, 2009

Related U.S. Application Data

(60) Provisional application No. 61/021,560, filed on Jan. 16, 2008.

(51) Int. Cl.
*G06F 12/00* (2006.01)
*G06F 13/00* (2006.01)
*G06F 13/28* (2006.01)
*G06F 13/42* (2006.01)

(52) U.S. Cl.
CPC ......... *G06F 13/4239* (2013.01); *Y02B 60/1228* (2013.01); *Y02B 60/1235* (2013.01)
USPC ........... 711/162; 711/103; 711/115; 711/161; 713/300; 713/323

(58) Field of Classification Search
CPC ................... G06F 12/0246; G06F 2212/2022; G06F 3/0679; G06F 2212/7203; G06F 11/1471; G06F 11/1441
USPC ........................... 711/103, 115; 365/226–229
See application file for complete search history.

(56) References Cited

U.S. PATENT DOCUMENTS

| | | | |
|---|---|---|---|
| 4,323,987 A | 4/1982 | Holtz et al. | |
| 5,341,330 A | 8/1994 | Wells et al. | |
| 5,689,704 A | 11/1997 | Yoshida et al. | |
| 5,950,013 A * | 9/1999 | Yoshimura et al. | 710/5 |
| 6,188,650 B1 | 2/2001 | Hamada et al. | |

(Continued)

FOREIGN PATENT DOCUMENTS

| | | |
|---|---|---|
| WO | WO 94/20906 | 9/1994 |
| WO | WO 2009/100031 | 8/2009 |

OTHER PUBLICATIONS

International Search Report and Written Opinion, dated Jul. 9, 2009, issued in International Application No. PCT/US2009/032886, 20 pages.

(Continued)

*Primary Examiner* — Yaima Rigol
(74) *Attorney, Agent, or Firm* — Meyertons, Hood, Kivlin, Kowert & Goetzel, P.C.

(57) ABSTRACT

In a managed memory subsystem, information associated with the memory subsystem is copied from volatile memory in the memory subsystem to host system memory. The copying can be over a standard interface. Responsive to memory subsystem power up from a powered down state or power loss, the information is copied from the host system memory back to the volatile memory in the memory subsystem, where the information can be used by the memory subsystem to perform memory operations. Transferring information from host system memory to volatile memory in a memory subsystem is faster and more power efficient than transferring the same information from non-volatile memory to volatile memory in the memory subsystem.

11 Claims, 2 Drawing Sheets

(56) References Cited

U.S. PATENT DOCUMENTS

| | | | |
|---|---|---|---|
| 6,199,076 B1 | 3/2001 | Logan et al. | |
| 6,263,453 B1 | 7/2001 | Anderson | |
| 6,282,624 B1* | 8/2001 | Kimura et al. | 711/202 |
| 6,388,961 B1 | 5/2002 | Ijichi | |
| 6,427,186 B1 | 7/2002 | Lin et al. | |
| 6,832,293 B1 | 12/2004 | Tagawa et al. | |
| 6,876,469 B1* | 4/2005 | Nakamura | 358/437 |
| 7,099,239 B2 | 8/2006 | Ogikubo | |
| 7,139,937 B1 | 11/2006 | Kilbourne et al. | |
| 7,234,024 B1 | 6/2007 | Kiselev | |
| 7,412,558 B2 | 8/2008 | Oribe et al. | |
| 7,523,249 B1* | 4/2009 | Estakhri et al. | 711/103 |
| 2003/0061189 A1 | 3/2003 | Baskins et al. | |
| 2003/0093610 A1 | 5/2003 | Lai et al. | |
| 2004/0062119 A1* | 4/2004 | Stimak et al. | 365/222 |
| 2004/0103238 A1* | 5/2004 | Avraham et al. | 711/102 |
| 2004/0186946 A1 | 9/2004 | Lee | |
| 2005/0251617 A1* | 11/2005 | Sinclair et al. | 711/103 |
| 2006/0008256 A1 | 1/2006 | Khedouri et al. | |
| 2007/0011445 A1 | 1/2007 | Waltermann et al. | |
| 2007/0016721 A1 | 1/2007 | Gay | |
| 2007/0073764 A1 | 3/2007 | Oks et al. | |
| 2007/0124531 A1 | 5/2007 | Nishihara | |
| 2007/0130441 A1 | 6/2007 | Wooten | |
| 2007/0136523 A1* | 6/2007 | Bonella et al. | 711/113 |
| 2007/0204128 A1 | 8/2007 | Lee et al. | |
| 2007/0300037 A1 | 12/2007 | Rogers et al. | |
| 2008/0104308 A1 | 5/2008 | Mo et al. | |
| 2008/0162814 A1* | 7/2008 | Kim | 711/115 |
| 2008/0177937 A1 | 7/2008 | Nishihara et al. | |
| 2008/0189452 A1* | 8/2008 | Merry et al. | 710/56 |
| 2009/0083478 A1 | 3/2009 | Kunimatsu et al. | |
| 2009/0089481 A1* | 4/2009 | Kapoor et al. | 711/103 |
| 2009/0150641 A1 | 6/2009 | Flynn et al. | |
| 2009/0198902 A1 | 8/2009 | Khmelnitsky et al. | |
| 2009/0198947 A1 | 8/2009 | Khmelnitsky et al. | |
| 2009/0198952 A1 | 8/2009 | Khmelnitsky et al. | |
| 2009/0307409 A1 | 12/2009 | Rogers et al. | |

OTHER PUBLICATIONS

Invitation to Pay Additional Fees and Partial International Search Report, dated May 14, 2009, issued in International Application No. PCT/US2009/032886, 10 pages.

Post et al., "IndelDS Oct. 7, 2009 Cache Tree", U.S. Appl. No. 12/509,267, filed Jul. 24, 2009.

Wakrat et al., "Restore IndelDS Oct. 7, 2009 Page", U.S. Appl. No. 12/509,071, filed Jul. 24, 2009.

Rogers, et al., "Device Memory Management", U.S. Appl. No. 12/134,998, filed Jun. 6, 2008.

International Search Report/Written Opinion in PCT/US2010/42707 mailed Sep. 7, 2010, 8 pages.

International Search Report/Written Opinion in PCT/US2010/42696 mailed Sep. 14, 2010, 8 pages.

Extended European Search Report in EP 10 17 0700 mailed Nov. 29, 2010, 7 pages.

* cited by examiner

MEMORY SUBSYSTEM HIBERNATION

RELATED APPLICATION

This application claims the benefit of priority from U.S. Provisional Application No. 61/021,560, for "Memory Subsystem Hibernation," filed Jan. 16, 2008, which provisional application is incorporated by reference herein in its entirety.

TECHNICAL FIELD

This subject matter is generally related to managing solid state memory systems.

BACKGROUND

Managed memory solutions use industry-standard interfaces to provide seamless integration with host processors and eliminate the need for host systems to manage the complexity and deficiency of built-in memory devices. A typical managed memory solution integrates memory and an embedded controller. The embedded controller can emulate a block device interface, thus replacing emulation that is commonly performed by the host system.

In some managed memory solutions, an embedded controller in the memory subsystem uses volatile memory to store information related to the current state of the memory subsystem. A copy of this state information is also stored in non-volatile memory of the memory subsystem to preserve the information in case of power loss.

When the memory subsystem is powered up from a powered down or power loss state, the embedded controller reads the state information from non-volatile memory and stores the information in volatile memory for easy access. The process of reading state information from non-volatile memory and storing the state information in volatile memory in the memory subsystem takes time due to overhead and some processing of the state information. This delay, however, is often of no concern when this power down/power up cycle is infrequent (e.g., during initial power up).

To save power, it can be desirable to shut down power to a memory subsystem frequently. Every time the memory subsystem is powered up from a shutdown state, the memory subsystem reads state information from non-volatile memory as previously described. If this shutdown/power up cycle occurs on a regular basis, the additional reads to non-volatile memory and subsequent data processing can cause delay and loss of power which can negate any benefit obtained by frequently shutting down power to the memory subsystem.

SUMMARY

In a managed memory subsystem, information associated with the memory subsystem is copied from volatile memory in the memory subsystem to host system memory. The copying can be over a standard interface. Responsive to memory subsystem power up from a powered down state or power loss, the information is copied from the host system memory back to the volatile memory in the memory subsystem, where the information can be used by the memory subsystem to perform memory operations. Transferring information from host system memory to volatile memory in a memory subsystem is faster and more power efficient than transferring the same information from non-volatile memory to volatile memory in the memory subsystem.

DETAILED DESCRIPTION

Example System

Figure 1:
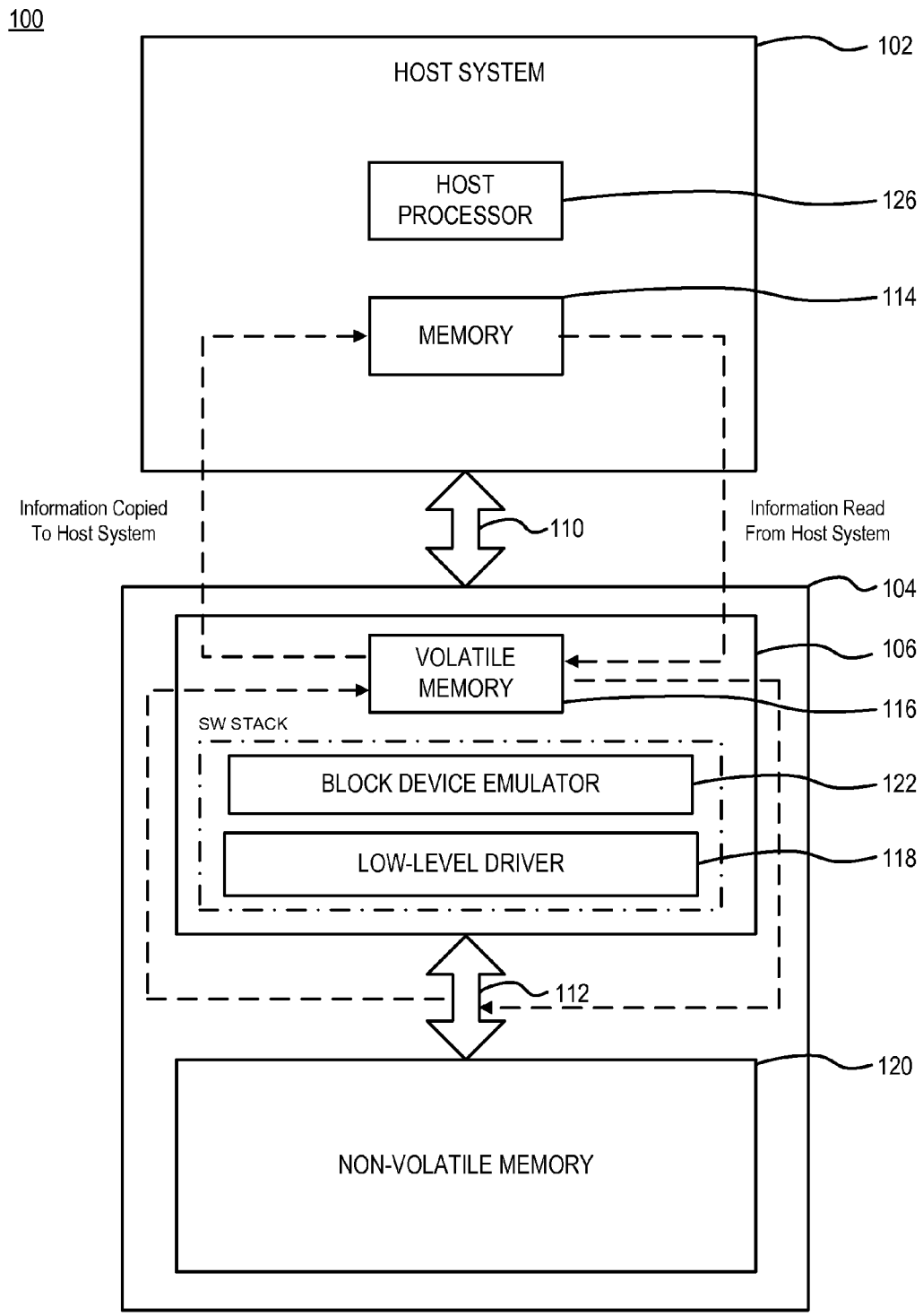
FIG. 1 is a block diagram of an example managed memory system.

FIG. 1 is a block diagram of example managed memory system 100. The Managed memory system 100 can be a solid state memory system (e.g., a managed NAND system) formed on a single substrate or chip (e.g., system on chip (SoC)). In some implementations, system 100 can include host system 102 coupled to memory subsystem 104 by interface 110. Interface 110 can be a standard interface, such as Advanced Technology Attachment (ATA) standard interface, MultiMediaCard (MMC) interface or Secure Digital (SD) interface. Some examples of memory subsystem 104 can include MMC/SD cards or SSD.

Memory subsystem 104 can include controller 106 coupled to non-volatile memory 120 by interface 112. Controller 106 can be an embedded controller. Interface 112 can be a NAND interface, for example. Block device emulator 122 can be a software layer which translates logical sector requests from host system 102 to physical reads/writes to non-volatile memory 120. Driver 118 in controller 106 can be a low-level driver that reads from and writes to non-volatile memory 120 (e.g., NAND memory). Volatile memory 116 (e.g., RAM) which can be integrated in, or accessible by, controller 106 can be used to store information relating to a current state of memory subsystem 104. States can include, for example, a mapping of logical sectors requested by host system 102 on non-volatile memory 120. More particularly, volatile memory 116 can store tables that translate requests from host system 102 to non-volatile memory 120. This state information is often stored in non-volatile memory 120 as well, so if there is a power shutdown or failure, controller 106 can retrieve the state information from non-volatile memory 120 and store the information in volatile memory 116 for quick access. The dashed lines conceptually illustrate this process. Memory subsystem 104 may include other components which have been omitted from FIG. 1 for clarity.

Host system 102 (e.g., a media player, mobile phone, digital camera) includes host processor 126 and memory 114 (e.g., RAM). Host processor 126 can execute instructions (e.g., firmware) to control communications across interface 110 and to access memory 114. If memory 114 is volatile memory, then memory 114 can be periodically refreshed by host processor 126. Host system 102 may include other components which have been omitted from FIG. 1 for clarity.

Example Process

Figure 2:
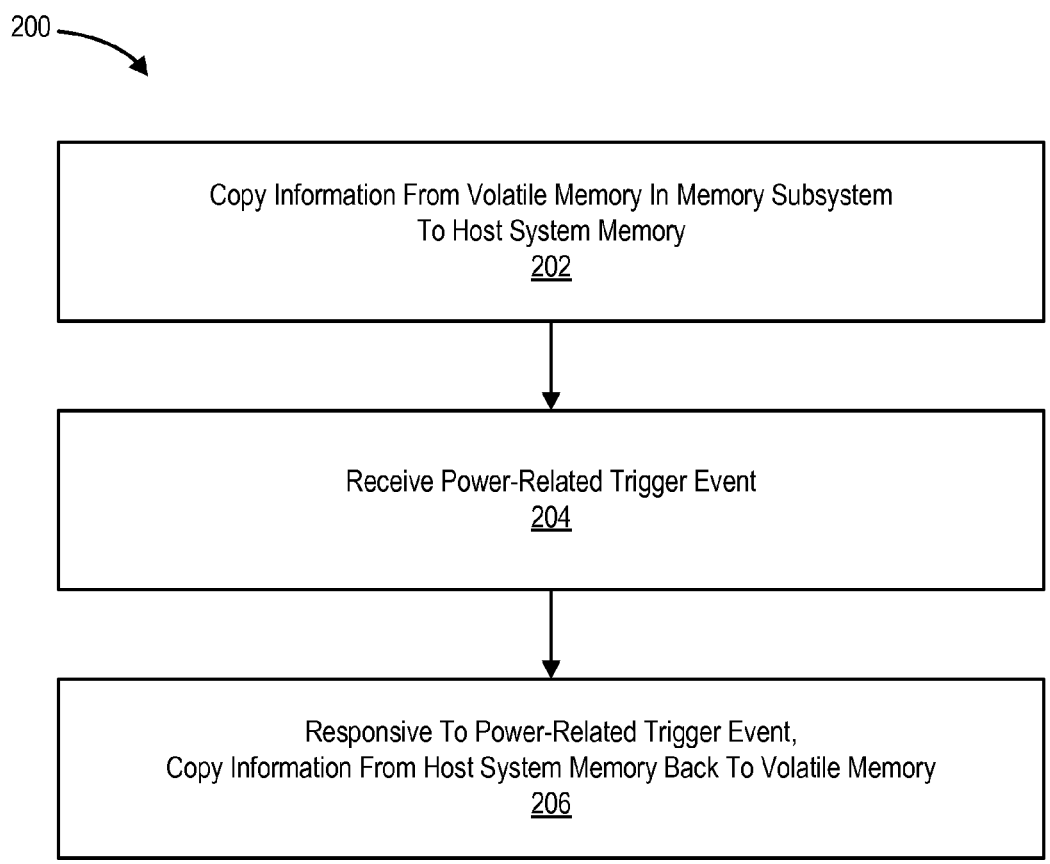
FIG. 2 is a flow diagram of an example boot process for the managed memory system of FIG. 1.

FIG. 2 is a flow diagram of an example power up process 200 for system 100 of FIG. 1. In some implementations, process 200 can begin when information (e.g., state information) is copied from volatile memory (e.g., RAM) in a memory subsystem to memory in a host system (202) coupled to the memory subsystem. For example, the information can include a physical address in non-volatile memory where the managed NAND is storing state information which can be used for a faster boot. Typically, NAND drivers save state information on the NAND so that when the system boots up the state information is read from the NAND. The state information is not always stored in the same location in NAND due to wear leveling algorithms. By sending the physical address of the state information to the host device, the managed NAND subsystem need not export the state information to the host device which can result in a faster boot time than if the state information was sent to the host device.

Next, a power-related trigger event (e.g., a power up request) is received or detected by the memory subsystem (204). In some implementations, the power-related trigger event can be an intentional power down of the memory subsystem to conserve power. Such an implementation can be useful for battery-operated devices.

Responsive to the power-related trigger event, the information is read from memory in the host system to volatile memory in the memory subsystem (206). Once the information is stored in the volatile memory, the information can be easily accessed by, for example, an embedded controller in the memory subsystem. In some implementations, the volatile memory can be included in the embedded controller. In other implementations, volatile memory can be included in other portions of the memory subsystem or external to the memory subsystem.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   copying state information from a volatile memory of a managed memory system into a non-volatile memory included in the managed memory system, wherein the state information includes information used to map logical sector requests from a host system to the non-volatile memory;
   copying address information from the volatile memory of the managed memory system to a volatile memory of the host system coupled to the managed memory system, wherein the address information includes a physical address of the state information stored in the non-volatile memory;
   responsive to a power-related trigger event, reading the address information from the volatile host system memory; and
   using the physical address included in the address information read from the volatile memory of the host system to access the state information stored in the non-volatile memory.

2. The method of claim 1, wherein the managed memory system is a managed NAND memory system.

3. The method of claim 1, wherein the address information is copied over a bus that conforms to at least one of the following standard bus protocols: Advanced Technology Attachment (ATA), MultiMediaCard (MMC) and Secure Digital (SD).

4. The method of claim 1, wherein the volatile memory of the managed memory system is accessible by an embedded controller in the managed memory system.

5. The method of claim 1, further comprising detecting the power-related trigger event by the managed memory system.

6. The method of claim 1, wherein the power-related trigger event comprises the managed memory system powering up from a powered down or power loss state.

7. A memory system, comprising:
   a host system comprising volatile memory; and
   a managed memory system comprising volatile memory and non-volatile memory, wherein information related to the managed memory system is stored in the volatile memory, and wherein the managed memory system comprises a processor configured to:
   copy state information from the volatile memory of the managed memory system into the non-volatile memory of the managed memory system, wherein the state information includes information used to map logical sector requests from the host system to the non-volatile memory of the managed memory system;
   copy address information from the volatile memory of the managed memory system to the volatile memory of the host system, wherein the address information includes a physical address of the state information stored in the non-volatile memory;
   read, responsive to a power-related trigger event, the address information from the volatile host system memory; and
   use the physical address included in the address information read from the volatile memory of the host system to access the state information stored in the non-volatile memory.

8. The memory system of claim 7, wherein the managed memory system is a managed NAND memory system.

9. The memory system of claim 7, wherein the address information is copied over a bus that conforms to at least one of the following bus protocols: Advanced Technology Attachment (ATA), MultiMediaCard (MMC) and Secure Digital (SD).

10. The memory system of claim 7, wherein the processor is further configured to detect the power-related trigger event.

11. The memory system of claim 7, wherein the power-related trigger event comprises the managed memory system powering up from a powered down or power loss state.

* * * * *